United States Patent [19]

Artieri

[11] Patent Number: 5,638,310
[45] Date of Patent: Jun. 10, 1997

[54] PIXEL MATRIX FILTER

[75] Inventor: Alain Artieri, Meylan, France

[73] Assignee: SGS-Thomson Microelectronics S.A., Saint Genis, France

[21] Appl. No.: 408,017

[22] Filed: Mar. 21, 1995

[30] Foreign Application Priority Data

Mar. 24, 1994 [FR] France .................................. 94 03706

[51] Int. Cl.$^6$ .................................................. G06F 17/10
[52] U.S. Cl. .................... 364/724.05; 358/448; 382/276; 365/189.05; 365/230.05
[58] Field of Search ......................... 364/724.05, 724.01, 364/724.16; 382/277, 280; 358/429, 448; 365/189.05, 230.05

[56] References Cited

U.S. PATENT DOCUMENTS

| | | | |
|---|---|---|---|
| 4,215,414 | 7/1980 | Huelsman | 358/448 |
| 5,144,572 | 9/1992 | Awata et al. | 364/724.05 |
| 5,157,775 | 10/1992 | Sanger | 395/425 |
| 5,325,329 | 6/1994 | Inoue et al. | 365/189.05 |
| 5,410,362 | 4/1995 | Terada et al. | 364/724.05 |

FOREIGN PATENT DOCUMENTS

| | | | |
|---|---|---|---|
| 0407273 | 1/1991 | European Pat. Off. | G06F 15/70 |
| 0517095 | 12/1992 | European Pat. Off. | H04N 5/14 |
| 0528739 | 2/1993 | European Pat. Off. | H04N 1/40 |
| 0557948 | 9/1993 | European Pat. Off. | H04N 7/13 |

OTHER PUBLICATIONS

IEE Transactions on Consumer Electronics, vol. 38, No. 3, Aug. 1992, New York, pp. 570–575, XP311895, P. Schiefer, "Picture Processing RAMs (PRAMs) for Motion Estimation".

IEE Micro, vol. 12, No. 5, Oct. 1992, Los Alamitos, pp. 22–27 XP330853, O. Duardo et al., "Architecture and Implementation of ICs for a DSC-HDTV Video Decorder System".

Primary Examiner—Paul P. Gordon
Assistant Examiner—Emmanuel L. Moise
Attorney, Agent, or Firm—Wolf, Greenfield, & Sacks, P.C.; James H. Morris

[57] ABSTRACT

A pixel matrix filter includes n input buses to receive pixels of n successive columns of the matrix; n delay circuits respectively receiving the pixels from the n input buses, each of these delay circuits introducing a delay of one column, whereby 2n pixels are simultaneously transmitted to the outputs of the n delay circuits and to the n input buses, successively; and n adders connected at least so that the i-th adder receives the i-th of the 2n pixels at a first input and the (i+1)th of the 2n pixels at a second input.

39 Claims, 4 Drawing Sheets

PIXEL MATRIX FILTER

BACKGROUND OF THE INVENTION

1. Field of the Invention

The present invention relates to a filter for carrying out a so-called half-pixel filtering of a picture block according to MPEG standards.

2. Description of the Related Art

Half-pixel filtering consists of processing the pixels of a picture block, or pixel matrix, in order to replace a specific pixel of the matrix with the sum of this pixel, of the adjacent right pixel and the adjacent bottom pixel. The filtered matrix obtained by processing all the pixels in this manner corresponds to a matrix that is shifted-down and shifted-right by one half pixel, hence the terminology "half-pixel filtering." In addition, the filter can be controlled to not filter at all, or to shift pixels only to the right or only to the bottom.

Figure 1:
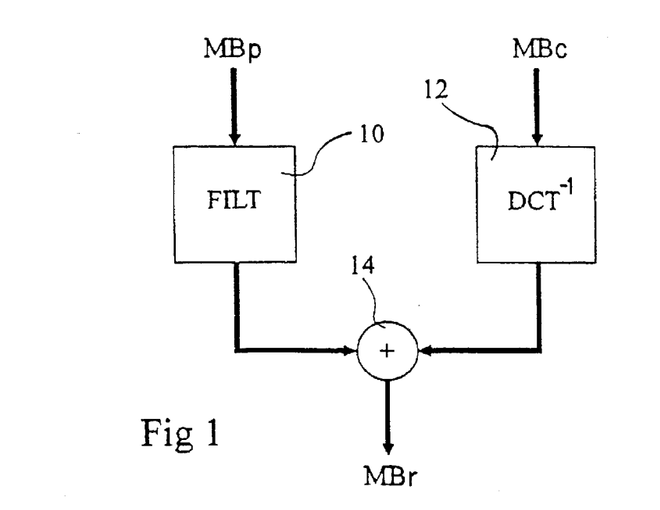
FIG. 1, above described, partially represents an MPEG decoder.

FIG. 1 represents a portion of an MPEG decoder in which a half-pixel filter 10 is used. The output of filter 10 and the output of an inverse discrete cosine transform circuit ($DCT^{-1}$) 12 are summed by an adder 14 to provide the pixels of a reconstructed image block MBr. The DCT circuit 12 receives pixels from a picture block MBc to be decoded, and filter 10 receives the pixels of a so-called predictor block MBp fetched from a previously reconstructed picture.

The position of this predictor block in the previously reconstructed picture is found with a motion estimation vector. The horizontal and vertical components of this vector can have non-integer values. The upper left corner of the block to be processed is determined by the integer parts of the components; the half-pixel filter shifts or does not shift the block by one half pixel to the right or downward depending on whether the horizontal or vertical component of the vector is integer or non-integer.

The processed picture blocks are in fact macro-blocks including separate luminance pixels Y, and chrominance pixels U and V.

Figure 2:
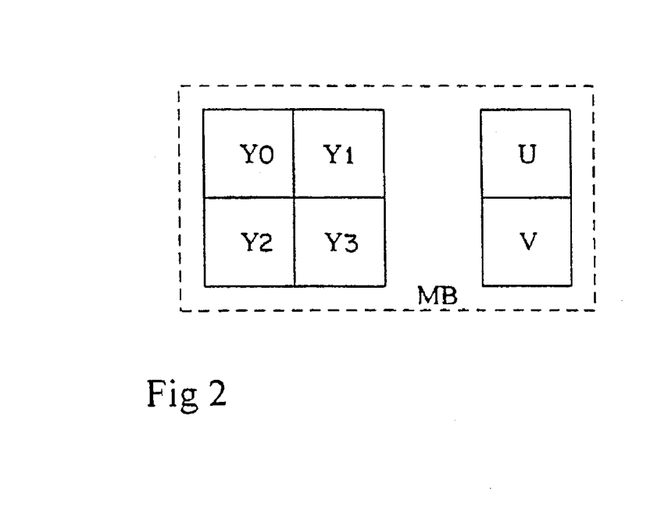
FIG. 2, above described, represents a picture macroblock of format 4:2:0.

FIG. 2 illustrates an exemplary format, referred to as 4:2:0, of a macroblock MB. Macroblock MB includes a luminance matrix Y of 16×16 pixels constituted by four sub-matrices Y0–Y3 of 8×8 pixels, and a chrominance matrix of 16×8 pixels constituted by two sub-matrices U and V of 8×8 pixels. Another possible format is referred to as 4:2:2 in which the chrominance matrix includes two sub-matrices U and V of 16×8 pixels.

SUMMARY OF THE INVENTION

An object of the present invention is to provide a particularly simple and fast half-pixel filter.

This object is attained in one illustrative embodiment of the invention with a pixel matrix filter including n input buses to receive pixels from n successive columns of the matrix; n delay circuits respectively receiving the pixels from the n input buses, each delay circuit introducing a delay of a column, whereby 2n pixels are simultaneously transmitted to the outputs of the n delay circuits and to the n input buses, successively; and n adders connected at least so that the i-th adder (i=1, 2, ... n) receives the i-th of the 2n pixels at a first input and the (i+1)th of the 2n pixels at a second input.

According to an embodiment of the invention, the n adders are connected to a switch provided in such a manner that the i-th adder receives:

at its first input, one among the i-th to (i+n−1)th of the 2n pixels, at its second input, one among the (i+1)th to (i+n)th of the 2n pixels, depending on the modulo n of a horizontal component of a vector determining the position of the matrix in a picture.

According to another embodiment of the invention, the output of each of the n adders is connected to a respective additional adder directly and through an at least one pixel delay circuit.

According to another embodiment of the invention, the delay of at least one pixel is a one pixel delay if the processed matrix is a matrix of luminance pixels and is a two pixel delay if the processed matrix is a matrix of chrominance pixels.

The present invention also relates to a method for processing a pixel matrix that is fetched with a vector in a picture memory accessible through a bus having a width of M pixels. In one illustrative embodiment, the method includes the steps of writing through the bus in a dual-port memory successively all the M-pixel wide picture bands partially including the matrix; reading from the dual-port memory through an n-pixel wide bus all the n-pixel wide picture bands partially including the matrix; and providing these bands line by line to a filter that processes each line in parallel.

The foregoing and other objects, features, aspects and advantages of the invention will become apparent from the following detailed description of the present invention when taken in conjunction with the accompanying drawings.

DETAILED DESCRIPTION

A filter according to the invention is designed to process pixel matrices by bands having a width of several pixels. The width of the bands is selected to correspond to the width of the filter bus. The width of this bus is selectable and in one application may be equal to the width of the output bus of the DCT circuit 12 (FIG. 1).

Figure 3:
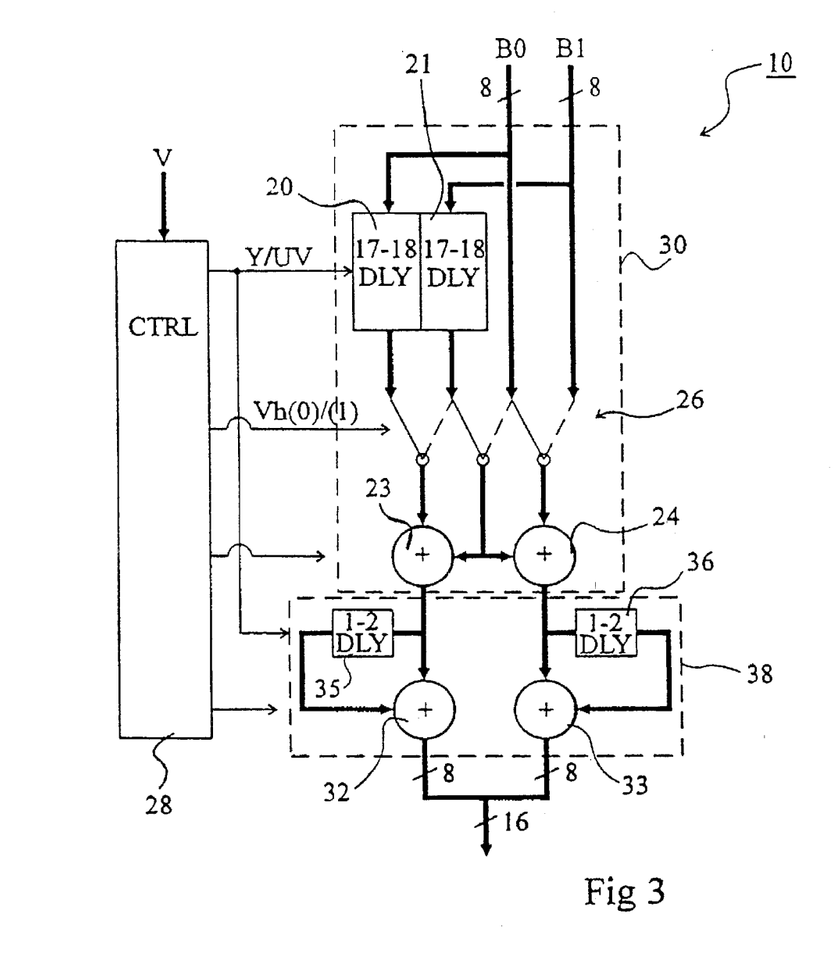
FIG. 3 represents an embodiment of a half-pixel filter according to the invention.

In the exemplary embodiment of FIG. 3, the filter bus is a 16-bit bus, which corresponds to a band width of 2 pixels. The pixels located in an even column of the picture (assuming the first column is number 0) are provided successively to an input bus B0 of the filter; the pixels located in an odd column are provided successively to an input bus B1. Buses B0 and B1 have a width of one pixel, that is, 1 byte. Each bus B0 and B1 is connected to a delay circuit 20 and 21, respectively, introducing a delay corresponding to a column of the matrix to be processed.

The outputs of the delay circuits 20 and 21, and buses B0 and B1 are connected to two adders 23 and 24 through a switch 26. In a first position (solid lines), switch 26 connects the two inputs of adder 23 with the outputs of the delay circuits 20 and 21, respectively, and connects a first input of adder 24 to the output of the delay circuit 21 and a second input to bus B0.

In a second position (dotted lines), switch 26 connects the two inputs of adder 23 with buses B0 and B1, respectively, and connects a first input of adder 23 to the output of the delay circuit 21, and a second input to bus B0.

A control circuit 28 receives the components of vector V determining the position of the macroblock to be processed. Each of the components is an integer or a non-integer. If the horizontal component Vh of the vector is an integer, the control circuit 28 inhibits adders 23 and 24, so that the pixels arriving on buses B0 and B1 are transmitted without modification to adders 32 and 33, respectively. If the vertical component of the vector is an integer, the control circuit 28 inhibits adders 32 and 33.

The first position of switch 26 is selected by the control circuit 28 when the integer part of the horizontal component Vh is even. The second position of switch 26 is selected when the integer part of the horizontal component Vh is odd.

Elements 20–26 constitute a horizontal filter of the half-pixel filter 30. The horizontal filter is intended to add by pairs the pixels of the lines of the matrix and provide each sum pixel to a vertical filter, that is described below.

The output of each adder 23 and 24 is provided to a respective adder 32 and 33 directly on a first input and on a second input through a respective one-pixel delay circuit 35 and 36. Elements 32–36 constitute a vertical filter 38 intended to add by pairs the pixels of each column of the processed matrix.

The outputs of adders 32 and 33 provide a filtered band of the processed matrix, a two-pixel wide band in the present case.

In a macroblock such as the one of FIG. 2, the luminance and chrominance pixels are separately processed. First, the luminance matrix Y (constituted by sub-matrices Y0–Y3), which is normally a 16×16-pixel matrix, is processed. To obtain after the half-pixel filtering a matrix also having 16×16 pixels, a column must be added to the right and a line to the bottom of the processed matrix. Thus, the filter is provided with a matrix of 17×17 pixels. The same operation is carried out on each of the chrominance sub-matrices U and V which then become 9×9-pixel sub-matrices and constitute a 18×9-pixel chrominance matrix. Moreover, the chrominance matrix alternatively includes a U pixel line and a V pixel line. Thus, to suitably vertically filter a chrominance matrix, the delay of the delay circuits 35 and 36 is selected of two pixels, in order to always add two pixels of the same type (U or V).

As represented in FIG. 3, the control circuit 28 provides a signal Y/UV allowing to select a delay of one pixel in circuits 35 and 36 when the processed matrix is a luminance matrix, and to select a delay of two pixels when the processed matrix is a chrominance matrix. Similarly, signal Y/UV selects in circuits 20 and 21 a delay of 17 pixels when the processed matrix is a luminance matrix, and a delay of 18 pixels when the processed matrix is a chrominance matrix.

The delay circuits 20, 21, and 35, 36 can be easily realized with flip-flops. Advantageously, circuits 20 and 21 are first-in/first out memories (FIFOs) which are filled as pixels arrive on buses B0 and B1, and that begin to be emptied once the content reaches 17 or 18 pixels, depending upon the state of signal Y/UV.

Figure 4A:
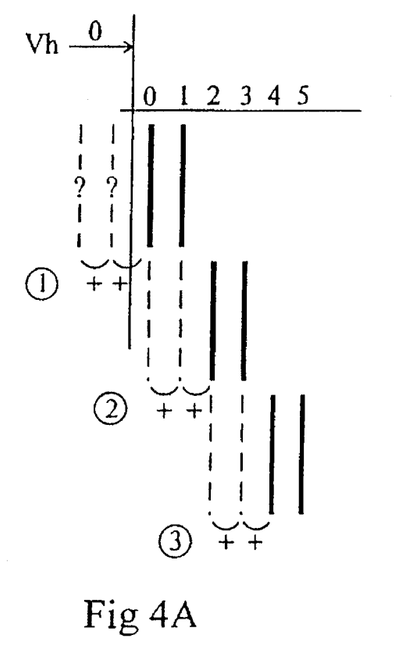
FIGS. 4A and 4B illustrate the operation of the filter of FIG. 3.

FIG. 4A illustrates the operation of the horizontal filter of FIG. 3 when the horizontal component Vh of the motion estimation vector is even, for example equal to zero (which means that the matrix to be filtered begins with column 0). The position of switch 26 is as represented in solid lines in FIG. 3. The arrival of a matrix column on bus B0 or B1 is represented by a vertical bold stripe. The same column delayed by a circuit 20 or 21 is represented below by dashed lines. ThE successive filtering steps are designated by circled numbers.

At step 1, column 0 is provided on bus B0 and column 1 is provided on bus B1. Adder 23 receives the outputs of the delay circuits 20 and 21 providing zero values and, in any case, without signification. Adder 24 receives column 0 and the output without signification of the delay circuit 21. Step 1 is a dummy step intended to obtain the delayed columns 0 and 1; the values provided by the filter are ignored.

At step 2, columns 2 and 3 of the matrix are provided on buses B0 and B1. Simultaneously, the delayed columns 0 and 1 are provided by the delay circuits 20 and 21. Adder 23 sums the pixels of columns 0 and 1 provided by the delay circuits 20 and 21, and adder 24 sums the pixels of delayed column 1 and of column 2 provided by bus B0.

At step 3, columns 4 and 5 are provided on buses B0 and B1. Simultaneously, the delayed columns 2 and 3 are provided by the delay circuits 20 and 21. Adder 23 sums the pixels of the delayed columns 2 and 3, and adder 24 sums the pixels of delayed column 3 and of column 4.

The columns are continuously provided by pairs, until all the columns of the matrix to be processed are provided. Each column triplet (one immediate column and two delayed columns) thus processed by the horizontal filter 30, provides two columns which are simultaneously processed by the vertical filter 38. The vertical filter 38 replaces in each column a pixel by the sum of this pixel and of the preceding pixel of the same type (luminance, U or V chrominance).

Figure 4B:
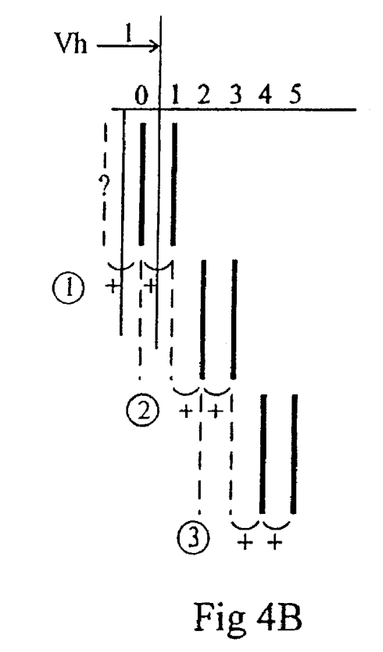

FIG. 4B illustrates the operation of the filter of FIG. 3 when the horizontal component Vh of the motion estimation vector is odd, for example equal to 1 (which means that the matrix to process begins with column 1). Switch 26 iS in the position represented in dotted lines in FIG. 3.

At step 1, column 0, which is not part of the matrix, and column 1 are provided on buses B0 and B1. Adder 23 sums the pixels, having then no signification, output by the delay circuit 21 and the pixels of column 0. Adder 24 sums the pixels of columns 0 and 1. Step 1 is a dummy step intended to obtain the delayed column 1.

At step 2, columns 2 and 3 are provided on buses B0 and B1. Simultaneously the delay circuits 20 and 21 provide columns 0 and 1. Adder 23 sums the pixels of column 1 provided by the delay circuit 21 and the pixels of column 2 provided by bus B0. Adder 24 sums the pixels of columns 2 and 3 provided by buses B0 and B1.

At step 3, columns 4 and 5 are provided on buses B0 and B1. Adder 23 sums the pixels of the delayed column 3 and the pixels of column 4. Adder 24 sums the pixels of columns 4 and 5, and so on.

Figure 5:
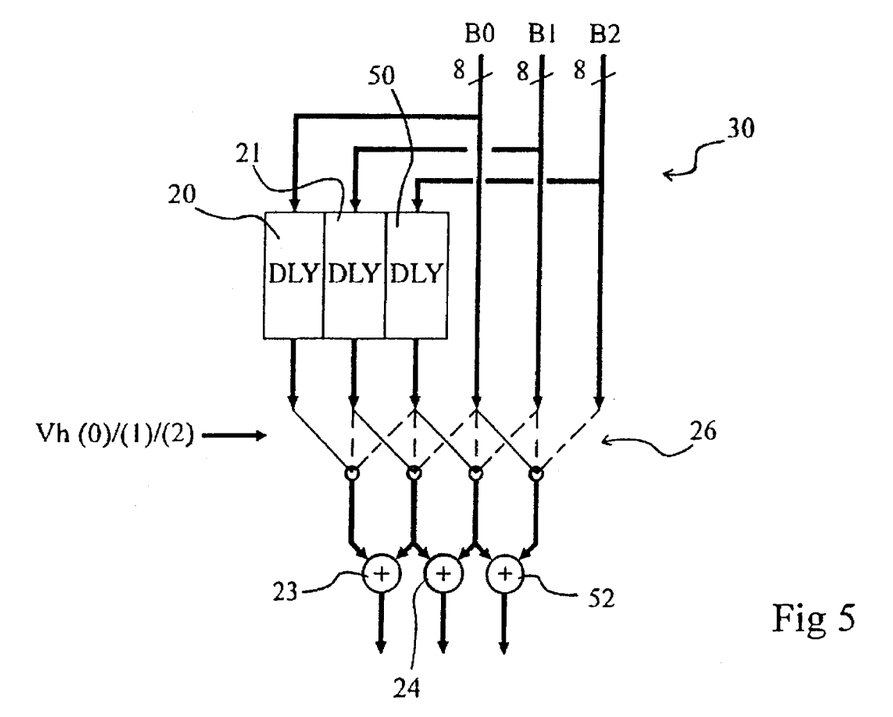
FIG. 5 partially represents an alternative embodiment of a half-pixel filter according to the invention.

FIG. 5 represents an alternative embodiment of a horizontal filter according to the invention, for showing that this type of filter can be used to process matrices by bands of more than two pixels. The example of FIG. 5 corresponds to processing three pixel wide bands.

As compared with the horizontal filter of FIG. 3, the horizontal filter of FIG. 5 includes an additional input bus B2 to receive pixels from a third column which is processed at the same time as the columns coming on buses B0 and B1. Bus B2 is connected to the input of a third one column delay circuit 50. A third adder 52 is associated with adders 23 and 24. Switch 26 can take three positions that are selected by the control circuit 28.

A first position of switch 26 (solid lines) is selected when the horizontal component Vh of the motion estimation vector is equal to 0 modulo 3. In this position, adder 23 receives the outputs of the delay circuits 20 and 21, adder 24 receives the outputs of the delay circuits 21 and 50, and adder 52 receives the output of the delay circuit 50 and the pixels of bus B0.

A second position (dotted lines) is selected when the component Vh is equal to 1 modulo 3. Adder 23 receives the outputs of the delay circuits 21 and 50, adder 24 receives the output of the delay circuit 50 and the pixels of bus B0, and adder 52 receives the pixels of buses B0 and B1.

A third position (dot and dash lines) is selected when component Vh is equal to 2 modulo 3. Adder 23 receives the output of the delay circuit 50 and the pixels of bus B0, adder 24 receives the pixels of buses B0 and B1, and adder 52 receives the pixels of buses B1 and B2.

To carry out the vertical filtering, adder 52 is followed, like adders 23 and 24, by an adder (not shown) associated with a one or two pixel delay circuit.

Those skilled in the art will be able, if required, to realize a filter according to the invention for processing a matrix by n-pixel wide bands.

In a filter according to the invention, the first column of a matrix corresponds with the first column of a band.

Figure 6:
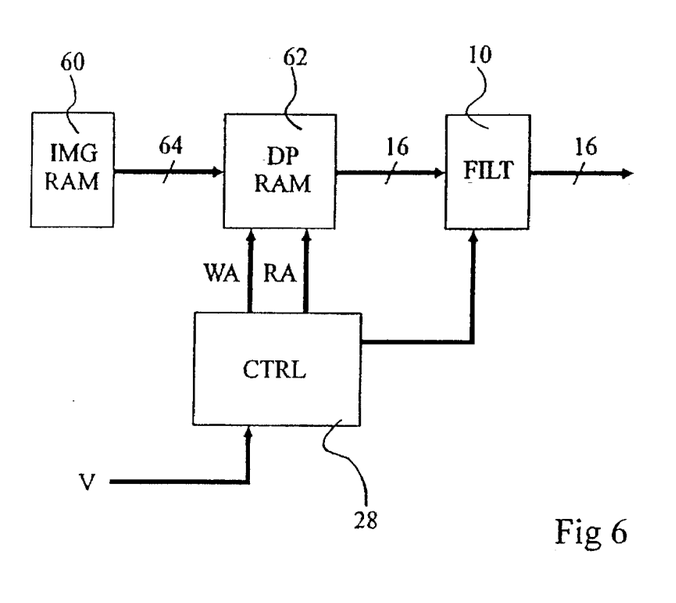
FIG. 6 represents a filter according to the invention preceded by a circuit for adapting the bus widths between a picture memory and the filter.

FIG. 6 represents a filter 10 according to the invention associated with a circuit for adapting the bus of a picture memory 60 to the filter bus. The width of the filter bus depends, as mentioned above, on the number of columns processed in parallel by the filter. In the example of FIG. 3, filter 10 processes two columns in parallel, which corresponds to a 16-bit input bus.

In contrast, the picture memory 60 communicates through a bus having a different width, which is advantageously a 64-bit width. These 64 bits correspond to an 8-pixel width and therefore to the width of the chrominance matrix UV and of each luminance sub-matrix Y0–Y3. Matrices UV and Y0–Y3 can thus be stored in the picture memory line by line, where each line corresponds to a 64-bit word.

However, as above mentioned, the matrices to be provided to the filter 10 are of 17×17 pixels or 18×9 pixels. Moreover, these matrices are not necessarily aligned with the chrominance and luminance matrices stored in the picture memory 60, that is, the first pixel, of 8 bits, of a matrix to process does not necessarily correspond to the eight first bits of a 64-bit word stored in the picture memory 60.

The problem encountered is to provide filter 10 with a predictor macroblock that can contain portions of several macroblocks stored in the picture memory. This problem is solved by using a reorganization circuit according to the invention including a dual-port memory 62 that is disposed between the memory bus 60 and the input bus of filter 10.

The dual-port memory 62 receives write addresses WA allowing to write in this memory from the bus of the picture memory 60, and receives read addresses RA allowing to provide filter 10 with its content. Addresses WA and RA are provided by the control circuit 28 which is intended to control memory 62 according to the exemplary method described below.

Figure 7A:
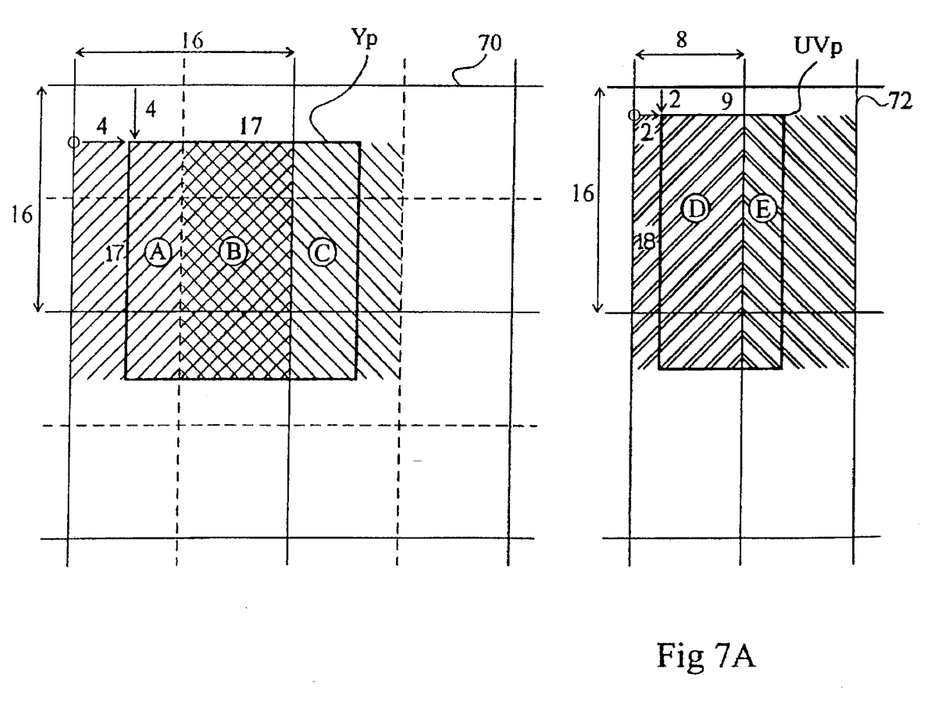
FIGS. 7A and 7B illustrate a method according to the invention for adapting the width of the picture memory bus the width of the filter bus.

FIG. 7A partially represents an area 70 of the picture memory 60 including the luminance matrices Y, and an area 72 including the chrominance matrices UV. The stored luminance and chrominance matrices are represented by a grid in solid lines. The stored luminance sub-matrices Y0–Y3 are represented by dotted lines. The 64-bit bus allows to access each 8-pixel line limited between two consecutive solid or dotted lines.

In bold lines are represented a luminance matrix Yp of 17×17 pixels and a chrominance matrix UVp of 18×9 pixels, belonging to a predictor macroblock to provide to filter 10. The horizontal and vertical components of the motion estimation vector are both, for example, equal to 4, as represented. This means that the first column of matrix Yp corresponds to column 4 of the first luminance matrix stored in area 70 and that the first line of matrix Yp corresponds to the fourth line of this first stored matrix. The components used to determine the position of the chrominance matrix UV are the integer parts of the halves of the components of the motion estimation vector.

Matrix Yp overlaps three bands A, B, and C, represented by hatched areas, which are 8 pixels wide and 17 pixels high. These three bands are such that each of their lines is fully accessible through the 64 bit bus. Similarly, the chrominance matrix UVp overlaps two bands D and E which are 8 pixels wide and 18 pixels high.

Bands A to E are successively written line after line in the dual-port memory 62 at successive addresses.

Figure 7B:
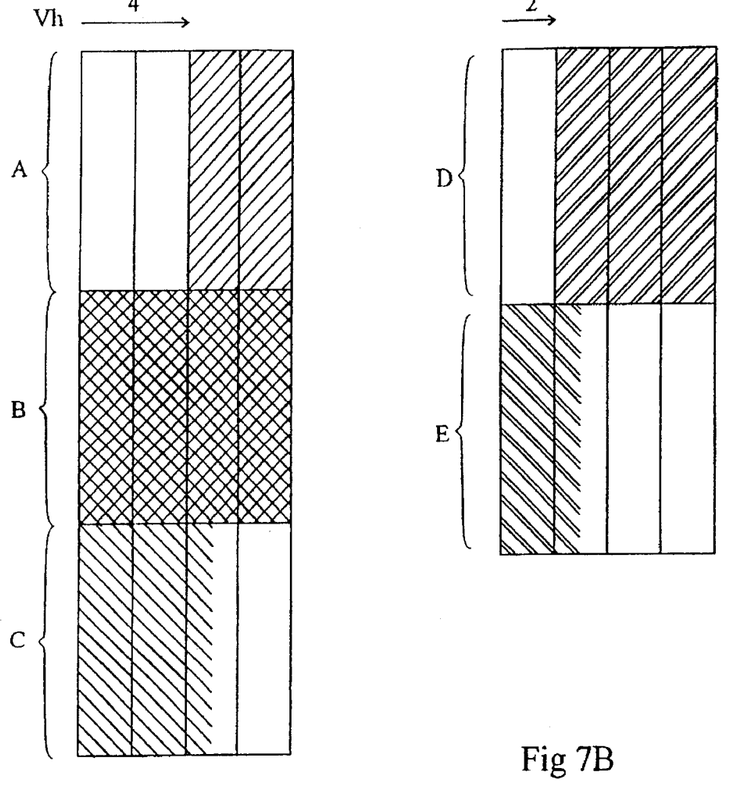

FIG. 7B represents the content of memory 62 after this operation. In this figure, each cell represents two columns of pixels and each row of cells corresponds to one of bands A to E, that is, the rows have a 64-bit (or 8-pixel) width. By thus filling the memory 62 by bands, the memory contains the whole macroblock to process but also useless data represented in FIG. 7B by white areas of the cells. Indeed, neither the first four columns in row A nor the last three columns in row C belong to the luminance matrix to process. Similarly, neither the first two columns of row D nor the last five columns of row E belong to the chrominance matrix to process. Thus, to provide the luminance and chrominance matrices to filter 10, the dual-port memory 62 is read from the third cell of row A down to the third cell of row C, and then from the second cell of row D down to the second cell of row E. The points from which read accesses of memory 62 begin are provided to the control circuit 28 by the motion estimation vector V, more precisely by the horizontal component of the vector.

Each of the cells corresponds to two columns of pixels and can therefore be provided by pairs of pixels to the 16-bit input bus of filter 10. Filter 10 processes the pairs of columns of each cell as described above with relation to FIG. 4A.

If the horizontal component of the vector is odd, the first column of the matrix to process is located in the second column of a cell, the first column of this cell being empty. The pair of columns of each cell is then processed according to the method described with relation to FIG. 4B, which cancels the first empty column of the first occupied cell.

Figure 8:
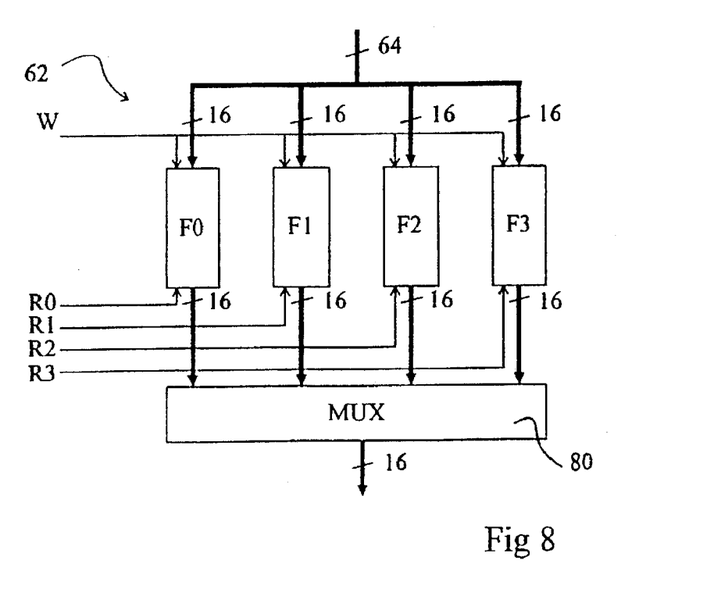
FIG. 8 represents an embodiment of a dual-port memory used in the circuit of FIG. 6.

FIG. 8 represents an exemplary dual-port memory 62 including a 64-bit input bus and a 16-bit output bus. Memory 62 includes four 16-bit FIFOs F0–F3, each of which corresponds to a column of cells of FIG. 7B and is provided with 16 corresponding bits from the 64-bit bus. The output of each FIFO F0–F3 can be selected as an output of the dual-access memory through a multiplexer 80. FIFOs F0–F3 are simultaneously write-selected by a line W. FIFOs F0–F3 are read as follows, with respective lines R0–R3.

In the example of FIG. 7B, to read the first pair of luminance columns, stored in FIFO F2, FIFOs F0–F2 are simultaneously read-selected and multiplexer 80 selects the output of FIFO F2. The next pairs of columns are read by sequentially read-selecting the FIFOs F3, F0, F1 and F2, the multiplexer 80 sequentially selecting the outputs of these FIFOs. The last luminance column, stored in FIFO F2, is read by simultaneously read-selecting FIFOs F2 and F3, multiplexer 80 selecting the output of FIFO F2. The same method is used to read the chrominance columns, the first and the last columns of which are stored in FIFO F1.

To read the first and last pairs of columns, the FIFOs storing non-used data are selected to free the space occupied by these data.

More generally, to read in N FIFOs the first columns of a matrix, the first F FIFOs are simultaneously selected, but only the output of the F-th FiFO containing the first column of the matrix is processed. To read the last columns of the matrix, the last 1 FIFOs are simultaneously selected, but only the output of the (N-1+1)-th FIFO including the last column is processed.

The first column of the matrix is, in memory 62, the column of rank equal to the horizontal component Vh modulo the number of columns (eight) that is transmitted in parallel on the input bus of memory 62.

The present invention has been described in relation with matrix columns. Of course, the columns can be either vertical or horizontal columns.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended to be limiting. The invention is limited only as defined in the following claims and the equivalents thereto.

What is claimed is:

1. A half-pixel filter for half-pixel filtering a pixel matrix having a plurality of pixel columns, comprising:

n input buses to successively receive sets of n adjacent columns of the pixel matrix;

n column delay circuits that each introduces a delay of one column and has an input and an output, the inputs of the n column delay circuits being respectively coupled to the n input buses to receive a current set of n pixel columns of the matrix, the outputs of the n column delay circuits providing a delayed set of n pixel columns of the matrix, the delayed and current sets of n pixel columns together forming sets of 2n pixel columns of the pixel matrix; and n first adders, coupled to the n input buses and the n column delay circuits, that receive the sets of 2n pixel columns of the pixel matrix, each of the n first adders receiving at a first input an ith column and at a second input an (i+1)th column of the sets of 2n pixel columns, each of the n first adders producing at an output a sum of its first and second inputs, the outputs of the n first adders providing sets of n half-pixel filtered columns of the pixel matrix.

2. The filter of claim 1, wherein the pixel matrix is fetched from a picture memory using a location vector having a horizontal component value, and wherein the filter further includes:

a switch that is coupled to the input buses and the n column delay circuits to receive the sets of 2n pixels columns, the switch selecting one of n output positions based on a selection signal representing the modulo n of the horizontal component value of the location vector, the switch having a plurality of outputs, one of the plurality of switch outputs being coupled to each of the first and second inputs of each of the n first adders, the plurality of switch outputs providing to the first input of each of the n first adders one among an ith column through an (i+n−1)th column of the sets of 2n pixel columns, and providing to the second input of each of the n first adders one among an (ith+1) column to an (ith+n) column of the sets of 2n pixel columns.

3. A method for filtering a pixel matrix in an n-pixel wide filter, wherein n is greater than 1, the pixel matrix being stored in a picture memory that is readable in M-pixel wide bands of pixels, the method including the steps of:

A. reading from the picture memory each M-pixel wide band of pixels that includes a pixel of the pixel matrix;

B. writing the M-pixel wide bands of pixels read in step A in a dual-port memory having an input port that is at least M pixels wide and an output port that is at least n pixels wide, the dual-port memory being readable in n-pixel wide bands of pixels;

C. reading from the dual-port memory each n-pixel wide band of pixels that includes a pixel of the pixel matrix, each of the pixels of each n-pixel wide band being read simultaneously; and D. successively passing the n-pixel wide bands of pixels read in step C through the n-pixel wide filter to filter the pixel matrix.

4. The method of claim 3, wherein the n-pixel wide filter is a half-pixel filter.

5. A method for filtering a pixel matrix comprising the steps of:

receiving a first set of n columns of pixels of the matrix;

B. storing the first set of n columns of pixels;

C. receiving a second set of n columns of pixels of the matrix that are adjacent the pixel columns in the first set;

D. combining the first set and the second set of n columns of pixels to form a group of 2n adjacent pixel columns; and E. half-pixel filtering a subset of the group of 2n adjacent pixel columns, the subset including n adjacent pixel columns of the pixel matrix.

6. The method of claim 5, wherein step E includes a step of adding each of the n adjacent pixel columns in the subset with an adjacent pixel column to create n horizontally filtered pixel columns.

7. The method of claim 6, wherein each of the pixels in the n horizontally filtered pixel columns has at least one vertically adjacent pixel, and wherein the method further includes a step of replacing each one of the pixels in the n horizontally filtered pixel columns with a pixel equal to the sum of the one of the pixels and its at least one vertically adjacent pixel.

8. The method of claim 5, wherein each of the pixels in the subset of the group of 2n adjacent pixel columns has at least one vertically adjacent pixel, and wherein step E further includes a step of replacing each one of the pixels in the subset of the group of 2n adjacent pixel columns with a pixel equal to a sum of the one of the pixels and its at least one vertically adjacent pixel.

9. An apparatus for filtering a pixel matrix stored in a picture memory that is readable in M-pixel wide bands of pixels, the apparatus comprising;

a dual-port memory having an input, couplable to the picture memory, that is at least M-pixels wide to receive each M-pixel wide band of pixels from the picture memory that includes pixels of the pixel matrix, the dual-port memory further including an n-pixel wide output, wherein n is greater than 1; and a filter having an n-pixel wide input, coupled to the output of the dual-port memory, that receives each n-pixel wide band of pixels from the dual-port memory that includes pixels of the pixel matrix.

10. The apparatus of claim 9, wherein the filter is a half-pixel filter.

11. The apparatus of claim 9, wherein the filter includes:

n input buses to successively receive sets of n adjacent columns of the pixel matrix;

n column delay circuits that each introduces a delay of one column and has an input and an output, the inputs of the n column delay circuits being respectively coupled to the n input buses to receive a current set of n pixel columns of the matrix, the outputs of the n column delay circuits providing a delayed set of n pixel columns of the matrix, the delayed and current sets of n pixel columns together forming sets of 2n pixel columns of the pixel matrix; and n first adders, coupled to the n input buses and the n column delay circuits, that receive the sets of 2n pixel columns of the pixel matrix, each adder i of the n first adders receiving at a first input an ith column and at a second input an (i+1)th column of the sets of 2n pixel columns, each of the n first adders producing at an output a sum of its first and second inputs, the outputs of the n first adders, thereby providing sets of n horizontally half-filtered columns of the pixel matrix.

12. The apparatus of claim 11, wherein the pixel matrix is fetched from a picture memory using a location vector having a horizontal component value, and wherein the filter further includes:

a switch that is coupled to the input buses and the n column delay circuits to receive the sets of 2n pixels columns, the switch selecting one of output positions based on a selection signal representing the modulo n of the horizontal component value of the location vector, the switch having a plurality of outputs, one of the plurality of switch outputs being coupled to each of the first and second inputs of each of the n first adders, the plurality of switch outputs providing to the first input of each of the n first adders one among an ith column through an (i+n−1)th column of the sets of 2n pixel columns, and providing to the second input of each of the n first adders one among an (ith+1) column to an (ith+n) column of the sets of 2n pixel columns.

13. The apparatus of claim 9, in combination with the picture memory.

14. The combination of claim 13, further comprising a memory bus, having a width of at least M pixels, coupled between an output of the picture memory and the input of the dual-port memory.

15. The combination of claim 14, wherein the filter includes:

a input buses to successively receive sets of n adjacent columns of the pixel matrix;

n column delay circuits that each introduces a delay of one column and has an input and an output, the inputs of the n column delay circuits being respectively coupled to the n input buses to receive a current set of n pixel columns of the matrix, the outputs of the n column delay circuits providing a delayed set of n pixel columns of the matrix, the delayed and current sets of n pixel columns together forming sets of 2n pixel columns of the pixel matrix; and n first adders, coupled to the n input buses and the n column delay circuits, that receive the sets of 2n pixel columns of the pixel matrix, each adder i of the n first adders receiving at a first input an ith column and at a second input an (i+1)th column of the sets of 2n pixel columns, each of the n first adders producing at an output a sum of its first and second inputs, the outputs of the n first adders, thereby providing sets of n horizontally half-filtered columns of the pixel matrix.

16. The combination of claim 15, wherein the pixel matrix is fetched from a picture memory using a location vector having a horizontal component value, and wherein the filter further includes:

a switch that is coupled to the input buses and the n column delay circuits to receive the sets of 2n pixels columns, the switch selecting one of n output positions based on a selection signal representing the modulo n of the horizontal component value of the location vector, the switch having a plurality of outputs, one of the plurality of switch outputs being coupled to each of the first and second inputs of each of the n first adders, the plurality of switch outputs providing to the first input of each of the n first adders one among an ith column through an (i+n−1)th column of the sets of 2n pixel columns, and providing to the second input of each of the n first adders one among an (ith+1) column to an (ith+n) column of the sets of 2n pixel columns.

17. An MPEG decoder for generating a reconstructed image block from a picture block and a predictor block, the predictor block having a pixel matrix including a plurality of pixel columns, the MPEG decoder comprising:

an inverse discrete cosine transform circuit having an input that receives n pixel columns from the picture block and an output that provides n columns of transformed pixels;

a filter for filtering the pixel matrix, the filter including;

n input buses to successively receive sets of n adjacent columns of the pixel matrix;

n column delay circuits that each introduces a delay of one column and has an input and an output, the inputs of the n column delay circuits being respectively coupled to the n input buses to receive a current set of n pixel columns of the matrix, the outputs of the n column delay circuits providing a delayed set of n pixel columns of the matrix, the delayed and current sets of n pixel columns together forming sets of 2n pixel columns of the pixel matrix; and n first adders, coupled to the n input buses and the n column delay circuits, that receive the sets of 2n pixel columns of the pixel matrix, each of the n first adders receiving at a first input an ith column and at a second input an (i+1)th column of the sets of 2n pixel columns, each of the n first adders producing at an output a sum of its first and second inputs, the outputs of the n first adders corresponding to an output of the filter and providing sets of n filtered columns of the pixel matrix; and an adder having a first input that is n pixel columns wide and is coupled to the output of the discrete cosine transform circuit, a second input that is n pixel columns wide and is coupled to the output of the filter, and an output that provides n columns of pixels of the reconstructed image block.

18. The MPEG decoder of claim 17, wherein the pixel matrix filtered by the filter is fetched from a picture memory using a location vector having a horizontal component value, and wherein the filter further includes:

a switch that is coupled to the input buses and the n column delay circuits to receive the sets of 2n pixels columns, the switch selecting one of n output positions based on a selection signal representing the modulo n of the horizontal component value of the location vector, the switch having a plurality of outputs, one of the plurality of switch outputs being coupled to each of the first and second inputs of each of the n first adders, the plurality of switch outputs providing to the first input of each of the n first adders one among an ith column through an (i+n−1)th column of the sets of 2n pixel columns, and providing to the second input of each of the n first adders one among an (ith+1) column to an (ith+n) column of the sets of 2n pixel columns.

19. The MPEG decoder of claim 18, wherein the filter further includes, n pixel delay circuits each having an output, and each having an input coupled to the outputs of one of the n first adders, each of the n pixel delay circuits introducing a delay of at least one pixel; and n second adders each having a first input coupled to the output of one of the n first adders and a second input coupled to the output of one of the n pixel delay circuits, said n second adders each producing at an output a sum of its first and second inputs, the outputs of the n second adders providing sets of n filtered columns of the pixel matrix.

20. The MPEG decoder of claim 17, wherein the filter further includes, n pixel delay circuits each having an output, and each having an input coupled to the output of one of the n first adders, each of the n pixel delay circuits introducing a delay of at least one pixel; and n second adders each having a first input coupled to the output of one of the n first adders and a second input coupled to the output of one of the n pixel delay circuits, said n second adders each producing at an output a sum of its first and second inputs, the outputs of the n second adders providing sets of n filtered columns of the pixel matrix.

21. The MPEG decoder of claim 20, wherein the pixel matrix has an associated vertical delay control signal indicating whether the pixel matrix is one of luminance pixels or of chrominance pixels, and wherein the n pixel delay circuits are responsive to the vertical delay control signal to delay the outputs of the n first adders by one pixel when the pixel matrix is one of luminance pixels, and by two pixels when the pixel matrix is one of chrominance pixels.

22. The MPEG decoder of claim 21, wherein the pixel matrix has an associated vertical delay control signal indicating whether the pixel matrix is one of luminance pixels or of chrominance pixels, and wherein the n pixel delay circuits are responsive to the vertical delay control signal to delay the outputs of the n first adders by one pixel when the pixel matrix is one of luminance pixels, and by two pixels when the pixel matrix is one of chrominance pixels.

23. The MPEG decoder of claim 22, wherein the location vector further includes a vertical component value, and wherein:

the n first adders each has a third input that receives a horizontal control signal that inhibits addition when asserted so that each of the n first adders passes to its output the sets of pixels received at its first input without modification;

the n second adders each has a third input that receives a vertical control signal that inhibits addition when asserted so that each of the n second adders passes to its output the sets of n filtered columns of the pixel matrix received at its first input without modification;

the n column delay circuits each has a second input that receives a horizontal delay control signal having first and second values, each of the n column delay circuits respectively setting a column delay equal to seventeen and eighteen pixels when the horizontal delay control signal has the first and second values;

the n pixel delay circuits each has a second input that receives the vertical delay control signal; and said filter further includes a control circuit that receives at least one signal representing the horizontal and vertical component values of the location vector, the control circuit having:

a first output, coupled to the third input of each of the n first adders, that asserts the horizontal control signal when the horizontal component value of the location vector is an integer;

a second output, coupled to the third input of each of the n second adders, that asserts the vertical control signal when the vertical component value of the location vector is an integer;

a third output, coupled to the second input of each of the n column delay circuits, that sets the horizontal delay control signal to the first value when the pixel matrix is one of luminance pixels, and to the second value when the pixel matrix is a one of chrominance pixels;

a fourth output, coupled to the second input of each of the n pixel delay circuits, that provides the vertical delay control signal; and a fifth output, coupled to the switch, that provides the selection signal.

24. A filter for filtering a pixel matrix having a plurality of pixel columns, comprising:

an input bus to successively receive sets of n adjacent columns of the pixel matrix, where in is greater than 1;

first storage means, coupled to the input bus to receive a current set of n pixel columns of the pixel matrix, for storing the current set of n adjacent columns of the pixel matrix and for providing a delayed set of n pixel columns of the pixel matrix, the delayed and current sets of n pixel columns together forming sets of 2n pixel columns of the pixel matrix; and first adder means, coupled to the input bus and the first storage means to receive the sets of 2n pixel columns, for adding together pairs of adjacent pixel columns in the sets of 2n pixel columns to produce sets of n-filtered columns of the pixel matrix.

25. The filter of claim 24, wherein the adder means further includes:

switch means for selecting a group of n+1 adjacent pixel columns from the sets of 2n pixel columns to be operated upon by the first adder means, the first adder means adding together each of n pixel columns in the group of n+1 adjacent columns with an adjacent pixel column in the group of n+1 adjacent pixel columns.

26. The filter of claim 25, wherein the pixel matrix is fetched from a picture memory using a location vector having a horizontal component value, and wherein the switch means includes means for selecting the group of n+1 pixel columns to be operated upon by the adder means from one of n groups of n+1 adjacent pixel columns from the sets of 2n pixel columns based on a selection signal representing the modulo n of the horizontal component value of the location vector.

27. The pixel matrix filter of claim 26, further comprising:
second adder means, coupled to the output of the first adder means to receive the n filtered columns of the filtered matrix, for adding each pixel in each one of the n filtered columns of the pixel matrix with another pixel in the one of the n filtered columns to produce n vertically filtered columns of the pixel matrix.

28. The filter of claim 27, wherein the pixel matrix has an associated vertical delay control signal indicating whether the pixel matrix is one of luminance pixels or of chrominance pixels, and wherein the second adder means includes means, responsive to the vertical delay control signal, for adding each pixel in each of the n filtered columns of the pixel matrix with a vertically adjacent pixel when the pixel matrix is one of luminance pixels, and for adding each one of the pixels in each of the n filtered columns of the pixel matrix with a pixel vertically once removed from the one of the pixels when the pixel matrix is a matrix of chrominance pixels.

29. The filter of claim 26, further comprising:
second adder means, coupled to the output of the first adder means to receive the n filtered columns of the filtered matrix, for adding each pixel in each one of the n filtered columns of the pixel matrix with another pixel in the one of the n filtered columns to produce n vertically filtered columns of the pixel matrix.

30. The filter of claim 29, wherein the pixel matrix has an associated vertical delay control signal indicating whether the pixel matrix is one of luminance pixels or of chrominance pixels, and wherein the second adder means includes means, responsive to the vertical delay control signal, for adding each pixel in each of the n filtered columns of the pixel matrix with a vertically adjacent pixel when the pixel matrix is one of luminance pixels, and for adding each one of the pixels in each of the n filtered columns of the pixel matrix with a pixel vertically once removed from the one of the pixels when the pixel matrix is a matrix of chrominance pixels.

31. The filter of claim 30, wherein the location vector further includes a vertical component value, and wherein the filter further includes:
means for passing the pixel columns received by the first adder means through the first adder means without modification when the horizontal component value of the location vector is an integer;
means for passing the pixel columns received by the second adder means through the second adder means without modification when the vertical component value of the location vector is an integer.

32. The filter of claim 31, wherein the filter further includes means for setting a delay of the first storage means to seventeen pixels when the pixel matrix is one of luminance pixels, and to eighteen pixels when the pixel matrix is a matrix of chrominance pixels.

33. A filter for filtering a pixel matrix having a plurality of pixel columns, wherein the pixel matrix is fetched from a picture memory using a location vector having a component value indicating a position of the pixel matrix in the memory, the filter comprising:
n input buses to successively receive sets of n adjacent columns of the pixel matrix;
n column delay circuits that each introduces a delay of one column and has an input and an output, the inputs of the n column delay circuits being respectively coupled to the n input buses to receive a current set of n pixel columns of the matrix, the outputs of the n column delay circuits providing a delayed set of n pixel columns of the matrix, the delayed and current sets of n pixel columns together forming sets of 2n pixel columns of the pixel matrix;
n first adders having first and second inputs that receive the sets of 2n pixel columns of the pixel matrix; and
a switch having inputs coupled to the n input buses and the n column delay circuits to receive the sets of 2n pixel columns and having outputs coupled to the n first adders, the switch being selectable by a control signal such that an i-th adder of the n first adders receives a k-th pixel column of the sets of 2n pixel columns at its first input and a (k+1)th pixel column of the sets of 2n pixel columns at its second input, where k is equal to i plus the modulo n of the component value of the location vector.

34. The filter of claim 33, further comprising:
n pixel delay circuits each having an output, and each having an input coupled to the output of one of the n first adders, each of the n pixel delay circuits introducing a delay of at least one pixel; and
n second adders each having a first input coupled to the output of one of the n first adders and a second input coupled to the output of one of the n pixel delay circuits, said n second adders each producing at an output a sum of its first and second inputs, the outputs of the n second adders providing sets of n filtered columns of the pixel matrix.

35. The filter of claim 34, wherein the pixel matrix has an associated vertical delay control signal indicating whether the pixel matrix is one of luminance pixels or of chrominance pixels, and wherein the n pixel delay circuits are responsive to the vertical delay control signal to delay the outputs of the n first adders by one pixel when the pixel matrix is one of luminance pixels, and by two pixels when the pixel matrix is one of chrominance pixels.

36. The filter of claim 33, further comprising:
n pixel delay circuits each having an output, and each having an input coupled to the output of one of the n first adders, each of the n pixel delay circuits introducing a delay of at least one pixel; and
n second adders each having a first input coupled to the output of one of the n first adders and a second input coupled to the output of one of the n pixel delay circuits, said n second adders each producing at an output a sum of its first and second inputs, the outputs of the n second adders providing sets of n filtered columns of the pixel matrix.

37. The filter of claim 36, wherein the pixel matrix has an associated vertical delay control signal indicating whether the pixel matrix is one of luminance pixels or of chrominance pixels, and wherein the n pixel delay circuits are responsive to the vertical delay control signal to delay the outputs of the n first adders by one pixel when the pixel matrix is one of luminance pixels, and by two pixels when the pixel matrix is one chrominance pixels.

38. The filter of claim 37, wherein the location vector further includes a vertical component value, and wherein:
the n first adders each has a third input that receives a horizontal control signal that inhibits addition when asserted so that each of the n first adders passes to its output the sets of pixels received at its first input without modification;

the n second adders each has a third input that receives a vertical control signal that inhibits addition when asserted so that each of the n second adders passes to its output the sets of n filtered columns of the pixel matrix received at its first input without modification;

the n column delay circuits each has a second input that receives a horizontal delay control signal having first and second values, each of the n column delay circuits respectively setting a column delay equal to seventeen and eighteen pixels when the horizontal delay control signal has the first and second values;

the n pixel delay circuits each has a second input that receives the vertical delay control signal; and said filter further includes a control circuit that receives at least one signal representing the horizontal and vertical component values of the location vector, the control circuit having:

a first output, coupled to the third input of each of the n first adders, that asserts the horizontal control signal when the horizontal component value of the location vector is an integer;

a second output, coupled to the third input of each of the n second adders, that asserts the vertical control signal when the vertical component value of the location vector is an integer;

a third output, coupled to the second input of each of the n column delay circuits, that sets the horizontal delay control signal to the first value when the pixel matrix is one of luminance pixels, and to the second value when the pixel matrix is one of chrominance pixels;

a fourth output, coupled to the second input of each of the n pixel delay circuits, that provides the vertical delay control signal; and a fifth output, coupled to the switch, that provides the selection signal.

39. A filter for filtering a pixel matrix having a plurality of pixel columns, comprising:

n input buses to successively receive sets of n adjacent columns of the pixel matrix, wherein n is greater than 1;

n column delay circuits that each introduces a delay of one column and has an input and an output, the inputs of the n column delay circuits being respectively coupled to the n input buses to receive a current set of n pixel columns of the matrix, the outputs of the n column delay circuits providing a delayed set of n pixel columns of the matrix, the delayed and current sets of n pixel columns together forming sets of 2n pixel columns of the pixel matrix; and n first adders, coupled to the n input buses and the n column delay circuits, that receive the sets of 2n pixel columns of the pixel matrix, each of the n first adders receiving at a first input an ith column and at a second input an (i+1)th column of the sets of 2n pixel columns, each of the n first adders producing at an output a sum of its first and second inputs, the outputs of the n first adders providing sets of n filtered columns of the pixel matrix.

* * * * *